United States Patent
Gubbi et al.

(10) Patent No.: US 6,891,822 B1
(45) Date of Patent: May 10, 2005

(54) METHOD AND APPARATUS FOR TRANSFERRING ISOCRONOUS DATA WITHIN A WIRELESS COMPUTER NETWORK

(75) Inventors: Rajugøpal R. Gubbi, Fair Oaks, CA (US); Natarajan Ekambaram, Rancho Cordova, CA (US); Steven Goss, El Dorado Hills, CA (US)

(73) Assignee: ShareWave, Inc., Austin, TX (US)

( * ) Notice: Subject to any disclaimer, the term of this patent is extended or adjusted under 35 U.S.C. 154(b) by 446 days.

(21) Appl. No.: 09/657,673

(22) Filed: Sep. 8, 2000

(51) Int. Cl.[7] .......................... H04Q 7/00; H04B 7/212; H04J 3/06; G06F 15/173
(52) U.S. Cl. ...................... 370/345; 370/330; 370/347; 370/350; 375/133; 375/295; 709/224
(58) Field of Search ................................ 370/245, 280, 370/336, 337, 330, 345, 349, 437, 350, 347, 209, 342, 335; 375/133, 295, 354, 362, 364

(56) References Cited

U.S. PATENT DOCUMENTS

| | | | |
|---|---|---|---|
| 5,040,175 A | * 8/1991 | Tuch et al. | 370/245 |
| 5,142,534 A | * 8/1992 | Simpson et al. | 370/336 |
| 5,239,543 A | * 8/1993 | Janssens | 370/468 |
| 5,384,777 A | * 1/1995 | Ahmadi et al. | 370/337 |
| 5,644,576 A | * 7/1997 | Bauchot et al. | 370/437 |
| 5,703,877 A | * 12/1997 | Nuber et al. | 370/395 |
| 5,949,777 A | * 9/1999 | Uyesugi et al. | 370/345 |
| 5,995,554 A | * 11/1999 | Lang | 375/295 |
| 6,011,784 A | * 1/2000 | Brown et al. | 370/329 |
| 6,026,082 A | * 2/2000 | Astrin | 370/336 |
| 6,097,707 A | * 8/2000 | Hodzic et al. | 370/321 |
| 6,108,727 A | * 8/2000 | Boals et al. | 710/68 |
| 6,111,863 A | * 8/2000 | Rostoker et al. | 370/329 |
| 6,252,910 B1 | * 6/2001 | West et al. | 375/261 |
| 6,263,210 B1 | * 7/2001 | Takahashi | 455/464 |
| 6,275,517 B1 | * 8/2001 | Izumi | 375/133 |
| 6,301,243 B1 | * 10/2001 | Copper et al. | 370/349 |
| 6,335,768 B1 | * 1/2002 | Reinold et al. | 348/723 |
| 6,381,211 B1 | * 4/2002 | Lysejko et al. | 370/209 |
| 6,381,222 B1 | * 4/2002 | Kikinis | 370/280 |
| 6,430,158 B1 | * 8/2002 | Sugita | 370/242 |
| 6,453,336 B1 | * 9/2002 | Beyda et al. | 709/204 |
| 6,466,587 B1 | * 10/2002 | Sugaya | 370/468 |
| 6,480,506 B1 | * 11/2002 | Gubbi | 370/468 |
| 6,504,836 B1 | * 1/2003 | Li et al. | 370/349 |
| 6,505,153 B1 | * 1/2003 | Van Thong et al. | 704/211 |
| 6,556,546 B1 | * 4/2003 | Maeda et al. | 370/282 |

FOREIGN PATENT DOCUMENTS

| | | |
|---|---|---|
| EP | 0 944 205 A2 | 9/1999 |
| EP | 1 104 962 A | 6/2001 |
| WO | WO 01/29655 A2 | 4/2000 |
| WO | WO 01/05099 A1 | 1/2001 |
| WO | WO 02/05492 A1 | 1/2002 |

* cited by examiner

*Primary Examiner*—Man Phan
(74) *Attorney, Agent, or Firm*—Winstead Sechrest & Minnick P.C.; James J. Murphy

(57) ABSTRACT

A communication protocol includes a hierarchical arrangement of time slots within a communication channel for transmission and reception of isochronous data (e.g., video, audio, etc.) between components of a computer network. One of the time slots may include a window for transmission of keyboard and/or cursor control data from a client unit to a server, for example as a series of past and present keyboard and/or cursor control entries, with these entries being accompanied by a counter value indicative of the number of new entries since a previous transmission. Audio rate control information may also be transmitted from the client unit to the server during the reverse time slot and may be used by the server to determine the amount of audio information to be transmitted to the client unit in a subsequent forward time slot transmission period. The audio rate control information is determined according to the amount of stored audio information at the client unit. The client unit transmits rate control information so as to ensure sufficient audio information will be available for synchronized playback with video information received from the server.

25 Claims, 4 Drawing Sheets

86

| Host μP Communications Manager 98 |

| Audio Manager 92 | Keyboard Manager 96 | Video Manager 94 |

| Network Stack 90 |

| 88 Media Communications Manager |

Fig. 4

METHOD AND APPARATUS FOR TRANSFERRING ISOCRONOUS DATA WITHIN A WIRELESS COMPUTER NETWORK

FIELD OF THE INVENTION

The present invention relates generally to a scheme for communications within a computer network and, in particular, to such communications as occur between a server and a client across a wireless link.

BACKGROUND

Modern computer networks allow for intercommunication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Further, interference from existing appliances, such as televisions, cellular telephones, wireless telephones and the like, may be experienced. Thus, analog wireless communication links offer less than optimum performance for a home environment and it would be desirable to have an improved scheme for wireless network communications in such areas.

SUMMARY OF THE INVENTION

A communication protocol includes a hierarchical arrangement of time slots within a communication channel for transmission and reception of isochronous data between components of a computer network. Preferably, at least one of the time slots includes a window for transmission of keyboard and/or cursor control data from a client unit to a server. This keyboard and/or cursor control data may be transmitted as a series of past and present keyboard and/or cursor control entries, with these entries being accompanied by a counter value indicative of the number of new entries since a previous transmission.

In general, the communication channel communicatively couples the server with the client unit and includes a number of time slots, the size of which are dynamically changeable according to operating conditions within the computer network. The hierarchical arrangement of time slots includes a first level made up of a forward time slot and a reverse time slot which together define transmission and reception periods for the server and the client unit of the computer network. There may also be one or more quiet time slots separating the forward and reverse time slots (e.g., to allow for half duplex radio operation).

In one embodiment, audio rate control information is transmitted from the client unit to the server during the reverse time slot. This audio rate control information may be used by the server to determine the amount of audio information to be transmitted to the client unit in a subsequent forward time slot transmission period. The audio rate control information is determined according to the amount of stored audio information at the client unit, and may be stored in an audio information buffer at the client unit. When so stored, the amount of audio information available at the client unit may be measured against preestablished thresholds. The client unit transmits rate control information so as to ensure sufficient audio information will be available for synchronized playback with video information received from the server.

Video information may also be transmitted from the server to the client unit during forward time slot transmission periods. The amount of video information so transmitted during forward time slot transmission periods depends upon the amount of audio information transmitted during such transmission periods.

A further embodiment provides a network that includes a server, a client unit and a wireless communication link communicatively coupling the server with the client according to a communication protocol that includes a number of transmission and reception time periods in which an amount of audio information transmitted from the server to the client unit is dynamically assigned by the server according to audio information requirements of the client unit. Keyboard and/or cursor control data may be transmitted from the client unit to the server over the wireless communication link, for example as a series of past and present keyboard and/or cursor control entries. The past and present keyboard and/or cursor control entries may be accompanied by a counter value indicative of the number of new entries since a previous transmission. Preferably, the communication protocol includes a forward time slot to accommodate transmissions by the server to the client unit and a reverse time slot to accommodate transmissions from the client unit to the server, each forward and reverse time slot including one or more frames of data including multimedia information.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which:

FIG. 4 illustrates a software stack for use in accordance with one embodiment of the present invention.

DETAILED DESCRIPTION

Described herein is a communication scheme for use between a server and an associated network client. The present scheme is generally applicable to a variety of wireless network environments, but finds especially useful application in a computer network which is located in a home environment. Thus, the present scheme will be discussed with reference to the particular aspects of a home environment. However, this discussion should in no way be seen to limit the applicability of the present invention to other network environments and the broader spirit and scope of the present invention is recited in the claims which follow this discussion.

As used herein, a "subnet" may describe a cluster of network components which includes a server and one or more clients associated therewith (e.g., coupled through a wireless communication link). Depending on the context of the discussion, a subnet may also refer to a network that includes a client and one or more subclients associated therewith. In some cases, the term "subnet" is used interchangeably with "cell". In this scheme, a "client" is a network node linked to the server through a wireless (or wired) communication link. Examples of clients include "set-top" boxes for audio/video equipment such as televisions, stereo components, satellite television receivers, cable television distribution nodes, and other household appliances. A server may be a separate computer that controls the communication link, however, in other cases the server may be embodied as an add-on card or other component attached to a host computer (e.g., a personal computer). Subclients may include keyboards, joysticks, remote control devices, multi-dimensional input devices, cursor control devices, display units and/or other input and/or output devices associated with a particular client.

Another term used throughout the following discussion is "channel". A channel is defined as the combination of a transmission frequency (more properly a transmission frequency band) and a pseudo-random (PN) code used in a spread spectrum communication scheme. In general, a number of available frequencies and PN codes may provide a number of available channels over a communication link within a subnet.

Figure 1:
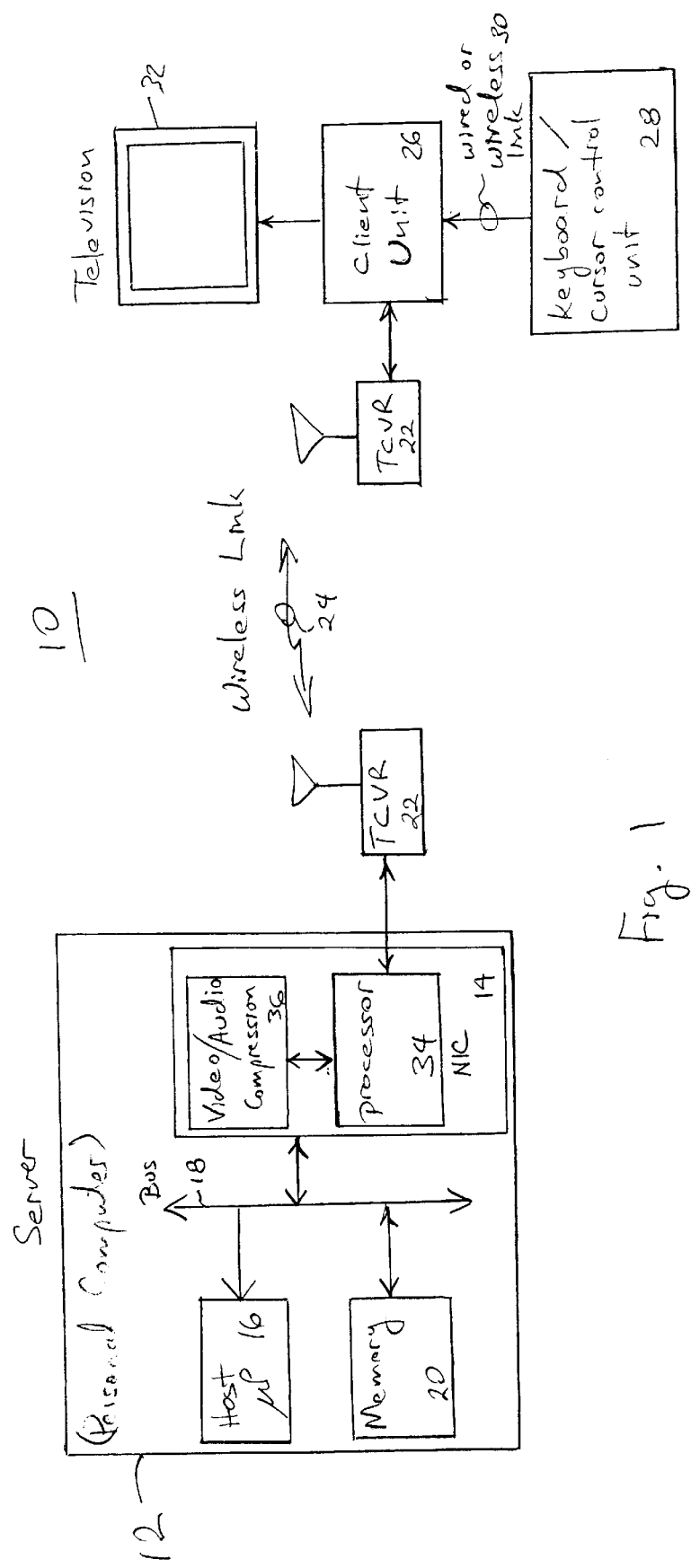
FIG. 1 illustrates a generalized network structure that is supported by a wireless communication protocol that is one embodiment of the present invention.

The generalization of the network structure that is supported by the present scheme is shown in FIG. 1. Subnet 10 includes a server 12. Server 12 may be personal computer configured with a network interface card (NIC) 14 which is communicatively coupled to the computer's host processor 16 over a bus (e.g., a PCI bus or the like) 18. Generally, the personal computer will also include memory 20 (both volatile and nonvolatile) as is customary in the art. Server 12 has an associated radio transceiver 22 (half duplex or full duplex), which is used to communicatively couple server 12 to the other node(s) of subnet 10. The communication link 24 generally supports both high and low bandwidth data channels and a command channel and although shown as a wireless link may also be or include a wired link.

Also included in subnet 10 is a client unit 26, which has its own radio transceiver 22 associated therewith for communication with server 12. A client 26 may communicate with an associated keyboard and/or cursor control device (e.g., a mouse or joystick or other subclient) 28 using a communication link 30, which may be a wireless (e.g., infra-red, ultrasonic, spread spectrum, etc.) or wired communication link. The client unit 26 also provides video and audio information to a television 32 (or other output/presentation device) for display/presentation to a user. Generally, the video and/or audio information so displayed or presented is transmitted from server 12 to the client unit 26 via NIC 14 and transceivers 22, across wireless link 24. Keyboard and/or cursor control data may be transmitted from client unit 26 to server 12 (e.g., in response to actual user inputs) across the same wireless link 24 either as part of a full duplex communication channel or in a reverse channel portion of a half duplex communication channel. Within the channel, one or more time slots in each direction may be used/reserved for control information.

NIC 14 generally includes a processor unit 34 (which operates under the control of software/firmware to provide the functionality described below) and a video/audio compression block 36. Video and audio information to be transmitted to the client unit 26 for eventual display/presentation through television 32 is first compressed by video/audio compression block 36 (e.g., using hardware and/or software) prior to transmission across wireless link 24 in order to conserve bandwidth. Therefore, client unit 26 will include appropriate decompression units (which may operate under the control of a control processor) to decompress this information prior to passing it to television 32. In one embodiment, video information is compressed using a variable rate compression scheme and audio information is compressed using ADPCM. The keyboard/cursor control data passed from client unit 26 to server 12 is generally low bandwidth data and need not be compressed prior to transmission, although in some embodiments it may prove convenient to do so (e.g., where the available bandwidth is very limited or where it is easier to provide mirror image functionality at NIC 14 and client unit 26 because of manufacturing considerations).

Each subnet 10 may be regarded as a network arranged in a hierarchical fashion with various levels of the hierarchy corresponding to levels at which inter-network component communication occurs. At a highest level of the hierarchy exists the server 12 which communicates with client 26 via the wireless radio channel 24. At other, lower levels of the hierarchy the client unit 26 communicates with the keyboard/cursor control unit 28 and television 32 using, for example, wired or wireless communication links (such as infrared links) such as communication link 30.

In general, subnet 10 may include the single server 12 and literally any number of client units 26. However, the number of simultaneous client units 26 supported depends on their forward and backward bandwidth requirements. In one embodiment, the wireless link 24 which couples server 12 and client unit 26 (e.g., via transceivers 22) is a full duplex, link. In other embodiments, however, the wireless link 24 is a half-duplex link.

Transceivers 22 are preferably configured to allow for intra-subnet communication within a typical home environment. In one embodiment, this means that transceivers 22 are capable of establishing and maintaining communications within a particular cell area. In one embodiment, a typical cell area may be approximately 100'×80'×30', allowing for communication throughout a typical home environment. The wireless link 24 supported by transceivers 22 preferably provides at least two separate frequency spaces to support two overlapping cells. Thus, transceivers 22 can operate in one of the available frequency bands. Within the same frequency band, individual subnets 10 preferably employ code division multiple access (CDMA) communication techniques for intra-subnet exchanges of information. For half-duplex operation, forward and reverse channels over the same frequency band (which employ the same CDMA pseudo-random (PN) code) may utilize dynamically adjustable time division multiplexing (DTDM) to differentiate between transmissions from server 12 and client units 26. Error correction (e.g., using Reed-Solomon encoders/decoders) and data encryption techniques may be employed to provide added robustness and security against eavesdropping.

For one embodiment, e.g., where half-duplex radio communication is used, the wireless communication scheme between server 12 and client unit(s) 26 may resemble a slotted link structure (described in greater detail below), with dynamic slot assignment. Such a structure will support point-to-point connections within subnet 10 and slot sizes may be re-negotiable within a session.

Figure 2:
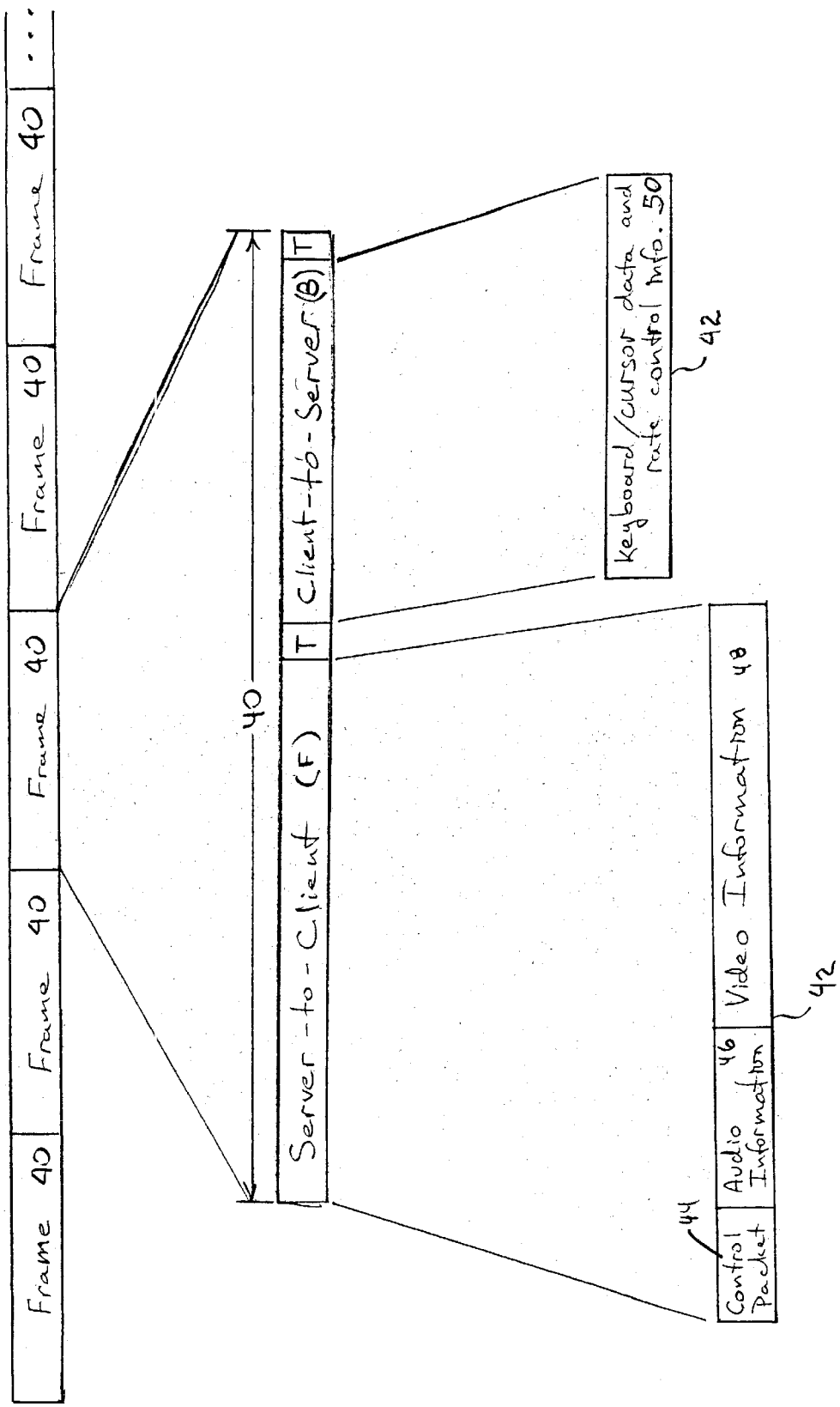
FIG. 2 illustrates a hierarchical arrangement for the transmission of data within a subnet according to one embodiment of the present invention.

Having thus described the basic topology of a network that supports the present communication scheme, exemplary operations (e.g., for half-duplex operations) for the network will be described. As shown in FIG. 2, these operations utilize a hierarchical arrangement for the transmission of real time, multimedia data (e.g., within frames 40) within a subnet 10. At the highest level within a channel, forward (F) and backward or reverse (B) slots of time are provided within each frame transmission period. During forward time slots F, server 12 may transmit video and/or audio data and/or commands to client unit 26, which is placed in a listening mode. During reverse time slots B, server 12 listens to transmissions from the client unit 26. Such transmissions may include keyboard or other data and/or commands from a client's associated keyboard/cursor control unit 28. At the second level of the hierarchy, each transmission slot (forward or backward) is made up of one or more radio data frames of variable length. Each radio data frame 42 is comprised of server/client data packets, which may be of variable length.

Each radio data frame 42 transmitted in the forward (F) portion of a frame 40 is made up of a control packet 44, one or more audio packets transmitted in an audio information window 46 and one or more video packets transmitted within a video information window 48. Variable length framing for the audio and video information windows 46 and 48 is preferred over constant length framing in order to allow smaller frame lengths during severe channel conditions and vice-versa. This adds to channel robustness and bandwidth savings. Also, the use of variable length frames allows for the transmission of sufficient audio data packets to meet client requests, as described further below. Although not shown in detail, it should be recognized that various encoding techniques may be used to allow for dynamic error recovery.

In the backward (B) portion of a frame 40, keyboard data and rate control information packets are transmitted as packets within a keyboard data and rate control window 50. Further, each frame 40 includes a number of radio turn around slots T. Slots T appear between any change from transmit to receive and vice-versa, and are meant to accommodate individual radios' turn around time (i.e., the time when a half-duplex radio 14 switches from transmit to receive operation or vice-versa). The time duration of each of these slots may be dynamically altered through renegotiations between the server 12 and the client unit 26 so as to achieve the best possible bandwidth utilization for the channel. Note that where full duplex radios are employed, each directional slot (i.e., F and B) may be fulltime in one direction, with no radio turn around slots required. Thus, the communication protocol allows for communicatively coupling two or more units of a computer network (e.g. a server and one or more clients) with a DTDM direct sequence spread spectrum (DS-SS) communication link. As shown, the DTDM DS-SS communication link includes dynamically allocable communication time slots for the units of the computer network. Forward and backward bandwidth allocation depends on the data handled and/or requested by the client unit 26.

Figure 3:
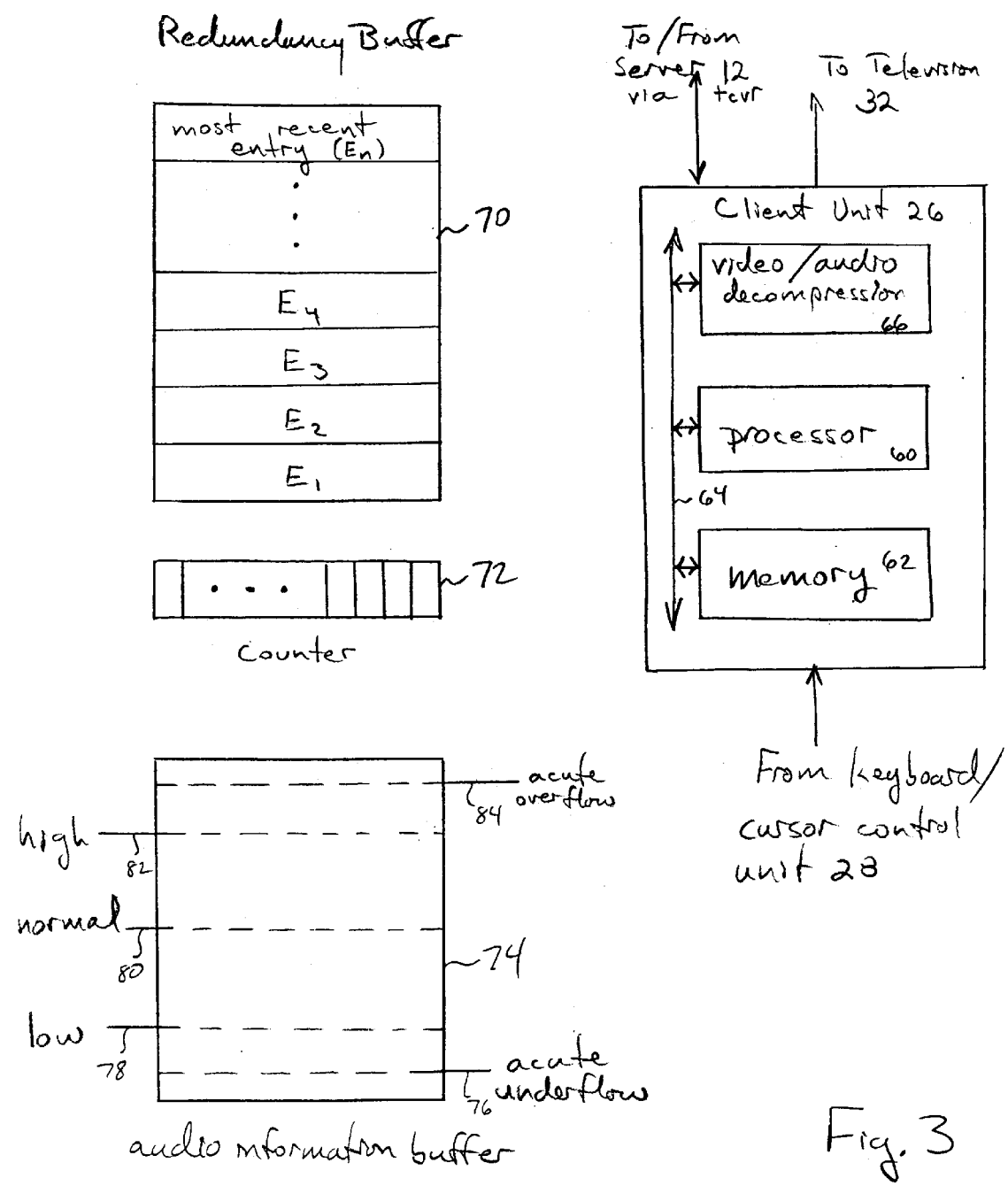
FIG. 3 illustrates a aspects of a client unit for use in a network in accordance with one embodiment of the present invention.

Turning now to FIG. 3, further details of the client unit 26 are shown. Like the NIC 14, client unit 26 includes a processor 60 and associated memory (which may include both volatile and nonvolatile memory) 62 coupled by a bus 64. Also included is a video/audio decompression block 66 that is configured to decompress video and audio information packets received from server 12 across wireless link 24. The video and audio information may then be subsequently provided to television 32 as discussed above. Keyboard and/or cursor control commands from keyboard/cursor control unit 28 are received at client unit 26 and subsequently provided to server 12.

The manner in which such keyboard/cursor control information is provided may now be discussed. A portion of memory 62 may be set aside as a redundancy buffer 70. That is, a block of memory (contiguous or not) may be reserved for use as the redundancy buffer 70. Stored in redundancy buffer 70 is the keyboard/cursor control data received from keyboard/cursor control unit 28. In one embodiment this may be the raw data, although in other embodiments the raw data will have been first packetized in accordance with the communication protocols employed across wireless link 24 prior to being stored. As shown, the redundancy buffer 70 may be of variable length and when full, older entries may be overwritten (e.g., in the case of a circular buffer) or deleted (e.g., to prevent overflow).

Also associated with the redundancy buffer 70 is a conventional counter (count up or count down) 72. The counter may be implemented in any of a variety of fashions, including as reserved space in memory 62 or as a register of processor 60. Similarly, in some embodiments the redundancy buffer 70 may be a register of processor 60 rather than a separate buffer.

In operation, commands which are transmitted from keyboard/cursor control unit 28 to client unit 26 are stored as entries in the redundancy buffer 70. Any communication protocol may be used for passing the commands between these units, and in one embodiment where the communication link between these units is an infra-red (IR) communication link, the well-known TWIRP communication protocol developed by SolutioNet, Ltd. of Williston, Vt. may be used. The contents of the redundancy buffer 70 along with the value of counter 72, which is incremented (or decremented) for each new entry in the redundancy buffer 70, may then be packetized and transmitted within keyboard/cursor data windows 40 of a frame 40 across wireless link 24.

Upon reception of this information at server 12, the transmitted counter value may be compared against the value of a master counter (which may be maintained as a register of processor 34 or in separate memory) to determine the number of new entries since the last transmission of the contents of the redundancy buffer 70. These new entries may be read out of the stored information received from client unit 26 by processor 34 and the commands/keystrokes decoded and processed as for conventional keyboard/cursor control commands. One of the benefits of this scheme is that even if packets are lost over the wireless communication link 24, this data can be recovered because of the retransmissions that will occur as entries are maintained in the redundancy buffer 70 for some period of time. The present scheme is also self-synchronizing through the use of the master counter and counter 72 so that if there are a significant number of packet losses, server 12 can instruct client unit 26 to flush its redundancy buffer 70, reset its counter 72 and begin transmitting keyboard/cursor control information anew.

Also shown in FIG. 3 is an audio information buffer 74, which may also be a portion of memory 62 or one or more registers of processor 60. The audio information buffer 60 has several configurable thresholds, including an acute underflow threshold 76, a low threshold 78, a normal threshold 80, a high threshold 82 and an acute overflow threshold 84. The audio information buffer 74 is used in connection with the transfer of audio information from server 12 to the client unit 26 as follows.

In general, NIC 14 receives an audio stream from the host microprocessor 16 and, using the audio compression block 36, encodes and compresses that audio stream prior to transmission to the client unit 26. In one example, ADPCM coding may be used to provide a 4:1 compression ratio. After transmission, client unit 26 may decompress and decode the audio information (e.g., using audio decompression unit 66) prior to playing out the audio stream to television 32. However, during this playback it is important to maintain synchronization between the audio stream and any video that is also being played out for display over television 32. So, in order to ensure that these streams are synchronized, the audio information is time stamped at NIC 14 with respect to the corresponding video frame. This time stamp is meant to indicate the time at which the audio should be played out relative to the video. Then, at the client unit 26, the audio information is played out according to the time stamp so as to maintain synchronization (at least within a specified tolerance, say 3 frames).

Because, however, the host microprocessor 16 is unaware of this time stamping and synchronization scheme, a flow control mechanism must be established to ensure that sufficient audio information arrives at client 26 in order to meet the synchronization play back requirements. By maintaining the audio information buffer 74, the client unit 26 can report back to the server 12 the status of its available audio information. For example, ideally, the client unit 26 will want to maintain sufficient audio packets on hand to stay at or near the normal threshold 80 (which may represent the number of packets needed to ensure that proper synchronization can be achieved given the current channel conditions). As the number of audio packets deviates from this level, the client unit 26 can transmit rate control information to server 12 to cause the server to transmit more or fewer audio packets as required.

So, if the number of audio packets stored in the audio information buffer 74 falls towards the low threshold 78, the client unit 26 can transmit a rate control instruction (e.g., in the keyboard/rate control window 50 of a frame 40) instructing the server to send more audio packets per frame. Alternatively, if the number of audio packets stored in the audio information buffer 70 tends to near the high threshold 82, the client unit 26 can transmit a rate control instruction advising the server 12 to reduce the number of audio packets transmitted per frame. The acute underflow and overflow marks represent catastrophic conditions which may require that a significant portion of a frame 40 be devoted to the transmission of audio packets (e.g., for an underflow condition) or that no audio packets should be transmitted (e.g., for an overflow condition). In some cases, during an underflow the client unit could replay the previously stored audio information with some filtering in the hope that new packets will arrive soon. There may, however, be a limit on the number of times such a replay should be performed.

If there is bandwidth available and the latency limits are acceptable, retransmission of some of the lost audio packets may be undertaken. To implement such a scheme, the receiving device, such as client unit 26 in FIG. 1, should be configured to detect the loss of any audio packets and request their retransmission. The request for retransmission may be sent in the command channel provided by the above-described communication protocol.

As indicated above, in one embodiment the video agent 36 in the host NIC card 14 employs a variable length compression mechanism. Software (i.e., the network stack) informs the video agent 36 of the available bandwidth for video in each (network) frame, and the corresponding picture frame is compressed to fit within the available bandwidth. One example of such a scheme could be the use of a wavelet transform followed by bit-level arithmetic coding and run length coding, in that order of sequence. The end of video bits may be marked by a End of Frame (EOF) indicator to let the decoder at client unit 26 know that the current picture frame has ended. Additionally, the communication protocol supports commands which may be transmitted between the video agents of host 12 and the client 26 so that information such as (a) the start of a new Key frame, (b) the start of a difference frame and (c) other status/error messages can be communicated. The compressed video is preferably transported in the forward slot over the communication link 24. If there is sufficient bandwidth available and the latency limits are acceptable, retransmission of some of the video packets can be considered. This would require the receiving device, client 26 in FIG. 1, to be configured to detect the loss of a video packet and request the necessary retransmission. The request for retransmission may be sent in the command channel provided by the communication protocol.

The received compressed bit stream at the client unit 26 may then be expanded using the run length decoder followed by the bit-level arithmetic decoder and then reverse transformed from wavelet domain into the picture domain. After this the picture may be appropriately converted from a non-interlaced picture frame into an interlaced frame format (like NTSC) and displayed on the display unit, such as TV 32.

Referring now to FIG. 4, the software stack 86 for aspects of the present communication scheme is shown. At the lowest level, a media communications manager 88 handles protocol functions for the exchange of data across wireless link 24. This may include such functions as error correction coding and packetizing of the data. Above that layer sits a network stack 90, which performs transport functionality and is responsible for the rate adjustments described above as well as determining how many packets will be transmitted in a given frame (recall the present scheme uses a variable length packet so this will vary from frame to frame). In part, this decision is based on the number of packets available for transmission, which information may be obtained from the audio manager layer 92, video manager layer 94 and keyboard manager layer (in the case of client unit 26) 96. In general, the keyboard manager 96 is always allocated one packet. Above the managers sits a host microprocessor communication manager 98, which handles communications between NIC 14 and host processor 16.

Returning now to FIG. 2, it was earlier indicated that the size of the audio information window 46 was set according to the demands of the client unit 26. It should now be apparent that these demands are communicated through the use of the rate control information described above, which in turn is based on the amount of available audio information in audio information buffer 74. The audio manager 92 communicates the window size requirements to the network stack 90 to allows sufficient space in a forward (F) portion of a frame 40 to accommodate the client unit's request based on the number of available audio packets (along with any needed retransmissions). Thus, the video information window 48 is set according to how munch remaining bandwidth in the forward (F) portion of the frame 40. In some cases, there may be no new video information to be transmitted, in which case audio information may be retransmitted. To allow for the variable window size for video transmissions, the video manager 94 may predict available video bandwidth based on a history of prior frames (say 5 or so) so as to ensure that the video manager 94 has sufficient video packets ready to fill this space.

Thus, a real time wireless network communication protocol has been described. Although discussed with reference to certain illustrated embodiments, the present invention should not be limited thereby. Instead, the present invention should only be measured in terms of the claims that follow.

What is claimed is:

1. A communication protocol, for the transmission and reception of isochronous video and audio data between components of a computer network, the protocol comprising a hierarchical arrangement of time slots within a communication channel, the hierarchical arrangement of time slots including a forward time slot and a reverse time slot which together define transmission and reception periods for a server and a client unit in the computer network, wherein video and audio data is transmitted from the server to the client unit during a forward time slot and audio rate control information is transmitted from the client unit to the server during the reverse time slot, the audio rate control information being used by the server to determine an amount of audio information to be transmitted to the client unit in a subsequent forward time slot so as to ensure sufficient audio information will be available for synchronized playback with associated video information received from the server.

2. The communication protocol of claim 1 wherein at least one of the time slots comprises a window for transmission of keyboard or cursor control data from the client unit to the server.

3. The communication protocol of claim 2 wherein at least one time slot in each of a forward and a reverse direction is reserved for control information passed between the components of the computer network.

4. The communication protocol of claim 2 wherein the keyboard or cursor control data is transmitted as a series of past and present keyboard or cursor control entries.

5. The communication protocol of claim 4 wherein the past and present keyboard or cursor control entries are accompanied by a counter value indicative of the number of new entries since a previous transmission.

6. The communication protocol of claim 5 wherein the communication channel communicatively couples the server with the client unit and comprises a number of time slots, the size of which are dynamically changeable according to operating conditions within the computer network.

7. The communication protocol of claim 1 wherein the sizes of the time slots are dynamically changeable according to the operating conditions of the computer network.

8. The communication protocol of claim 1 wherein the audio rate control information is determined according to the amount of stored audio information at the client unit.

9. The communication protocol of claim 1 wherein the audio information is stored in an audio information buffer at the client unit.

10. The communication protocol of claim 8 wherein the amount of audio information stored at the client unit is measured against preestablished thresholds.

11. The communication protocol of claim 1 wherein the video information is transmitted during forward time slot transmission periods.

12. The communication protocol of claim 11 wherein the video information is compressed using a variable rate compression scheme according to available bandwidth within the communication channel.

13. The communication protocol of claim 12 wherein the audio information is compressed using ADPCM.

14. The communication protocol of claim 11 wherein the amount of video information transmitted during forward time slot transmission periods depends upon the amount of audio information transmitted during such transmission periods.

15. A network for the transmission and reception of isochronous video and audio data, comprising:
   a server;
   a client unit; and
   a wireless communication link communicatively coupling the server with the client unit according to a communication protocol that includes a number of time periods in a hierchical arrangement within a communications channel, wherein the client unit transmits audio rate control information to the server during a first reverse time period and the server transmits audio information to the client unit during a second forward time period, wherein the amount of audio information transmitted to the client unit by the server is determined responsive to the audio rate control information transmitted from the client unit to the server so as to ensure sufficient audio information will be available for synchronized playback with associated video information received from the server.

16. The network of claim 15 wherein keyboard or cursor control data is transmitted from the client unit to the server over the wireless communication link.

17. The network of claim 16 wherein the keyboard or cursor control data is transmitted as a series of past and present keyboard or cursor control entries.

18. The network of claim 17 wherein the past and present keyboard or cursor control entries are accompanied by a counter value indicative of the number of new entries since a previous transmission.

19. The network of claim 15 wherein the time periods comprise forward time slots to accommodate transmissions by the server to the client unit and reverse time slots to accommodate transmissions from the client unit to the server, each forward and reverse time slot including one or more frames of data including multimedia information.

20. The network of claim 15 wherein the client unit comprises a processor, a video decompression agent, an audio decompression agent and a keyboard agent.

21. The network of claim 15 wherein the server comprises a software stack which includes (a) a network stack performing transport functionality (b) one or more application agents, (c) a media communication agent, and (d) a host processor communication manager.

22. The network of claim 21 wherein information from the one or more application agents is utilized in making dynamic decisions regarding transmission slot sizes for data to be passed across the communication link.

23. A protocol for transmitting isochrronous audio and video data on a wireless network, the protocol comprising a plurality of frames within a communications channel and organized as a hierarchy of time slots, wherein each frame comprises:
  a first forward time period for the transmission of audio and video data from a server to a client on the wireless network; and
  a second reverse time period for the transmission of audio rate control information from the client to the server, wherein the client sends the audio rate control information to ensure it receives from the server sufficient audio data for synchronized playback of the audio data with the video data, wherein the server sends audio data to the client in the forward time period of a subsequent frame responsive to the audio rate control information received from the client so as to ensure sufficient audio information is transmitted to the client for synchronized playback of the audio data with the video data.

24. The protocol of claim 23 herein the plurality of frames are transmitted at a rate corresponding to a data rate of the video data.

25. The protocol of claim 24 wherein the audio data is buffered at the client.

* * * * *